United States Patent
Reese et al.

(10) Patent No.: US 7,305,454 B2
(45) Date of Patent: Dec. 4, 2007

(54) APPARATUS AND METHODS FOR PROVISIONING SERVICES

(75) Inventors: David Byrne Reese, Oakland, CA (US); Peter A. Panec, Santa Monica, CA (US)

(73) Assignee: Minor Ventures, LLC., San Francisco, CA (US)

( * ) Notice: Subject to any disclaimer, the term of this patent is extended or adjusted under 35 U.S.C. 154(b) by 0 days.

(21) Appl. No.: 10/727,089

(22) Filed: Dec. 2, 2003

(65) Prior Publication Data

US 2004/0167987 A1  Aug. 26, 2004

Related U.S. Application Data

(63) Continuation-in-part of application No. 09/820,966, filed on Mar. 30, 2001.

(51) Int. Cl.
*G06F 15/16* (2006.01)
*G06F 17/30* (2006.01)
*G06Q 10/00* (2006.01)
G06F 15/173 (2006.01)
G06F 7/00 (2006.01)

(52) U.S. Cl. ............... 709/217; 709/219; 709/226; 707/3; 707/10; 705/5

(58) Field of Classification Search ............... 345/765; 370/331; 707/10, 3; 705/1, 5
See application file for complete search history.

(56) References Cited

U.S. PATENT DOCUMENTS

| | | | | |
|---|---|---|---|---|
| 5,119,377 A | | 6/1992 | Cobb et al. | |
| 5,222,234 A | * | 6/1993 | Wang et al. | 707/3 |
| 5,255,389 A | * | 10/1993 | Wang | 707/10 |
| 5,333,312 A | * | 7/1994 | Wang | 707/10 |
| 5,850,518 A | | 12/1998 | Northrup | 395/200.33 |
| 6,032,118 A | * | 2/2000 | Tello et al. | 705/1 |
| 6,055,513 A | * | 4/2000 | Katz et al. | 705/26 |
| 6,073,142 A | | 6/2000 | Geiger et al. | |
| 6,091,714 A | * | 7/2000 | Sensel et al. | 370/260 |
| 6,226,623 B1 | * | 5/2001 | Schein et al. | 705/35 |
| 6,233,565 B1 | * | 5/2001 | Lewis et al. | 705/35 |
| 6,292,789 B1 | * | 9/2001 | Schutzer | 705/40 |
| 6,338,050 B1 | * | 1/2002 | Conklin et al. | 705/80 |

(Continued)

OTHER PUBLICATIONS

"Evite Tour", Evite 2001.*

(Continued)

*Primary Examiner*—Melvin H. Pollack
(74) *Attorney, Agent, or Firm*—Beyer Weaver LLP

(57) ABSTRACT

Disclosed are methods and apparatus for effectively provisioning services for access by other entities or services. In general, a service manager is configured to manage the provisioning of services between remote entities within a computer network. In general terms, a remote entity offers a service to another remote entity through the service manager. The service manager facilitates formation of the offer to one or more Invitee(s) specified by the service provider. After an offer is formed, it may then be provided to the specified Invitee(s). After an Invitee receives an offer, the Invitee may accept the offer through the service manager or let the offer expire. The service manager also preferably tracks the status of each offer and whether each specified Invitee has accepted such offer. After an Invitee accepts an offer, the service manager preferably records information sufficient for the Invitee to use the offered service.

51 Claims, 6 Drawing Sheets

U.S. PATENT DOCUMENTS

| | | | |
|---|---|---|---|
| 6,351,739 B1* | 2/2002 | Egendorf | 705/40 |
| 6,397,197 B1* | 5/2002 | Gindlesperger | 705/37 |
| 6,397,254 B1 | 5/2002 | Northrup | 709/227 |
| 6,421,705 B1 | 7/2002 | Northrup | 709/203 |
| 6,449,634 B1* | 9/2002 | Capiel | 709/206 |
| 6,470,357 B1 | 10/2002 | Garcia, Jr. et al. | |
| 6,470,385 B1 | 10/2002 | Nakashima et al. | |
| 6,526,044 B1 | 2/2003 | Cookmeyer et al. | |
| 6,529,489 B1* | 3/2003 | Kikuchi et al. | 370/331 |
| 6,546,413 B1 | 4/2003 | Northrup | 709/200 |
| 6,549,944 B1 | 4/2003 | Weinberg et al. | |
| 6,587,838 B1* | 7/2003 | Esposito et al. | 705/26 |
| 6,651,087 B1 | 11/2003 | Dennis | |
| 6,671,713 B2 | 12/2003 | Northrup | 709/203 |
| 6,671,746 B1 | 12/2003 | Northrup | 712/200 |
| 6,704,768 B1 | 3/2004 | Zombek et al. | |
| 6,714,987 B1 | 3/2004 | Amin et al. | |
| 6,735,621 B1* | 5/2004 | Yoakum et al. | 709/218 |
| 6,763,104 B1 | 7/2004 | Judkins et al. | |
| 6,813,278 B1* | 11/2004 | Swartz et al. | 370/466 |
| 6,857,072 B1* | 2/2005 | Schuster et al. | 713/160 |
| 6,886,026 B1* | 4/2005 | Hanson | 709/202 |
| 6,917,962 B1* | 7/2005 | Cannata et al. | 709/204 |
| 6,925,488 B2 | 8/2005 | Bantz et al. | |
| 6,934,532 B2* | 8/2005 | Coppinger et al. | 455/412.1 |
| 6,952,717 B1* | 10/2005 | Monchilovich et al. | 709/205 |
| 7,099,950 B2* | 8/2006 | Jones et al. | 709/230 |
| 2001/0029478 A1* | 10/2001 | Laster et al. | 705/37 |
| 2002/0013854 A1 | 1/2002 | Eggleston et al. | |
| 2002/0029201 A1* | 3/2002 | Barzilai et al. | 705/80 |
| 2002/0058277 A1 | 5/2002 | Bathe et al. | |
| 2002/0087371 A1* | 7/2002 | Abendroth | 705/7 |
| 2002/0091533 A1* | 7/2002 | Ims et al. | 705/1 |
| 2002/0161611 A1* | 10/2002 | Price et al. | 705/7 |
| 2003/0018808 A1 | 1/2003 | Brouk | |
| 2003/0041178 A1 | 2/2003 | Brouk et al. | |
| 2003/0053459 A1 | 3/2003 | Brouk | |
| 2003/0058277 A1* | 3/2003 | Bowman-Amuah | 345/765 |
| 2003/0126136 A1 | 7/2003 | Omoigiu | |
| 2003/0191816 A1* | 10/2003 | Landress et al. | 709/219 |
| 2004/0078373 A1 | 4/2004 | Ghoneimy et al. | |
| 2004/0167987 A1 | 8/2004 | Reese | |
| 2004/0186891 A1* | 9/2004 | Panec et al. | 709/206 |
| 2004/0243574 A1 | 12/2004 | Giroux et al. | |
| 2005/0080914 A1 | 4/2005 | Lerner et al. | |
| 2005/0086297 A1 | 4/2005 | Hinks | |
| 2005/0228863 A1 | 10/2005 | Palmeri et al. | |
| 2005/0234928 A1 | 10/2005 | Shkvarchuk | |

OTHER PUBLICATIONS

"Excite@Home Excite's #1 webshots provides users with comprehensive photo capabilities; unveiling "My Photos" wherin excite uses can create personal albumns, share photos, search photos and order quality prints by Ofoto", Jorgensen, Mr Presswire, Jun. 200.*

"Coblist-Cob: Welcome to my photo album!", Sep. 2000.*

"Evite.com launches Free web based group activity organizer", PR Newswire, Jul. 1999.*

"Evite Relies on MySQL to Deliver millions of Invitations", MySQL 1998.*

Greef, Arthur, "Partner Interface Process Technical Architecture", © 1998, RossettNet/PIP Technical Architecture.doc, pp. 1-12.

Stross, Kenneth, "Managed B2B Infrastructure Technical Architecture", © Jul. 31, 2000, Transact Technical Architecture, pp. 1-14.

"A Global Infrasture for the Guaranteed Delivery of B2B Transactions over the Internet", Slam Dunk Networks, © 2000, pp. 1-18.

ipo.com—Venture, Internet Document, URL:http://www.ipo.com/venture/pcprofile.asp?p+IPO&pc+20323, p. 1.

CrossWeave Company, Internet Document, © 2001, URL:http://www.crossweave.com/company_overview.html, p. 1.

GlueCode/Our Mission Vision, Internet Document, URL:http://www.gluecode.com/company/mission_vision.html, p. 1.

Viquity/Press Release, "Viquity Demonstrates Power of Hub Technology In ebXNL Proof-of-Concept", Dec. 12, 2000, pp. 1-2.

Festa, Paul, "Start-up gains Netscape funding, Microsoft engineers", NET News.com, Sep. 10, 2000, pp. 1-2.

Office Action mailed Feb. 9, 2005 from U.S. Appl. No. 09/820,964.

Office Action mailed Jun. 20, 2005 from U.S. Appl. No. 09/820,966.

Office Action mailed Sep. 28, 2005 from U.S. Appl. No. 09/820,965.

Office Action mailed Sep. 30, 2005 from U.S. Appl. No. 09/820,966.

Office Action mailed Oct. 26, 2004 from U.S. Appl. No. 09/820,965.

Office Action mailed Dec. 14, 2004 from U.S. Appl. No. 09/820,966.

Office Action mailed Dec. 28, 2005 from U.S. Appl. No. 09/820,964.

"SML: Simplifying XNL." Robert E. La Quey, Nov. 1999.

"Trails.com Teams Up With Evite to Offer Email Trip Planning Service," Homes, 2000.

Office Action mailed dated May 19, 2005 from U.S. Appl. No. 09/820,966.

Office Action mailed Jun. 6, 2005 from U.S. Appl. No. 09/820,965.

Office Action mailed Jun. 6, 2005 from U.S. Appl. No. 10/728,356.

* cited by examiner

| Offer ID | Org. ID | Service ID | Offer Descript. | Expir. Selection | Expir. Date |
|---|---|---|---|---|---|
| Offer A | Org. X | Service A | Description A | TRUE | 12/05/03 |
| Offer B | Org. X | Service B | NULL | FALSE | N/A |
| Offer C | Org. Y | Service C | Description C | TRUE | 01/01/05 |

302

| Service ID | Org. ID | Service Location | Security Requirement Type |
|---|---|---|---|
| Service A | Org. X | URL A | https |
| Service B | Org. X | URL B | certificate |
| Service C | Org. Y | URL C | password |

304

| Invitee ID | Offer ID | Invitee Identifying Info. | Accept | Accept Date | Register |
|---|---|---|---|---|---|
| Invitee 1 | Offer A | Info1 (Org. Y, etc.) | TRUE | 12/03/03 | TRUE |
| Invitee 2 | Offer A | Info2 (Org. Z, etc.) | FALSE | N/A | FALSE |
| Invitee 3 | Offer B | Info3 (Org. Q, etc.) | TRUE | 01/01/04 | FALSE |
| Invitee 4 | Offer C | Info4 (Org. R etc.) | TRUE | 12/01/03 | TRUE |

306

| Service ID | Grantor ID | Grantee ID |
|---|---|---|
| Service A | Org. X | Invitee 1 of Org. Y |
| Service C | Org. Y | Invitee 4 of Org. R |

308

| Org. ID | Org. Info |
|---|---|
| Org X | Info10 |
| Org. Y | Info11 |
| Org. R | Info12 |

310

| User ID | User Info |
|---|---|
| Invitee 1 | Info1 (Org. Y, etc.) |
| Invitee 4 | Info4 (Org. R, etc.) |
| User 1 | Info20 (Org. X, etc.) |
| User 2 | Info21 (Org. X, etc.) |

APPARATUS AND METHODS FOR PROVISIONING SERVICES

CROSS REFERENCE TO RELATED PATENT APPLICATION

This application claims priority and is a continuation-in-part of co-pending U.S. patent application, having application Ser. No. 09/820,966, entitled "System and Method for Routing Messages between Applications", filed Mar. 30, 2001 by Lev Brouk et al., which application is herein incorporated by reference in its entirety for all purposes.

BACKGROUND OF THE INVENTION

The present invention relates to methods and apparatus for processing data within a computer network. More specifically, it relates to facilitating provisioning of services within such computer network.

Corporate reliance on technology has become more complex and more pervasive. Increasingly, companies are identifying opportunities to extend their core business or cut costs using the Internet. Both trends have put increasing priority on integrating disparate business applications. For this reason, enterprise application integration (EAI) has emerged as a solution for allowing information technology departments to build bridges that are designed to unify their legacy systems into a single enterprise application. Ideally, the creation of this single enterprise application would not require sweeping changes to the underlying structures.

EAI suppliers typically offer end point solutions for managing business process interactions between end points within a computer network. Although a specific enterprise software package may be designed to transparently handle diverse business processes carried out by two or more end nodes, each specific enterprise software package requires releasing customized connectors or adapters which will work for the specific business processes and applications used by the specific end nodes. As a result, these enterprise solutions are not easily scalable. Additionally, scores of adapters need to be built for each vendor (for example, Oracle corporation of Redwood Shores, Calif. SAP AG of Waldorf, Germany, and PeopleSoft Inc. of Plessanton, Calif.). As each supplier releases new versions of their software. EAI vendors find themselves unable to gain traction under the burden of supporting their existing adapters.

Notwithstanding the benefits of EAI, the software costs and resource investments of EAI prevent small-to-medium enterprise (SME) customers from embracing EAI solutions. For SMEs, reliance on web service providers represents an increasingly attractive alternative.

The web service provider market is one of the fastest growing segments of the software industry. Service providers make enterprise applications (e.g., human resources administration, recruiting, travel and expense management, sales force automation) available to customers over the web at a server device. Those applications are fully managed and hosted by the provider, providing significant cost savings to enterprises.

Some providers merely host and manage third-party packaged software for their customers ("managed hosters"). Others build new applications from the ground up to take advantage of the benefits and cost-savings of web service provider model. Service providers enjoy the profit margins and operational scalability of consumer Web companies like eBay Inc. of San Jose, Calif. and Yahoo! Inc. of Sunnyvale, Calif. While at the same time offering the feature sets of complex enterprise software applications such as software applications by PeopleSoft and Siebel Systems Inc. of San Mateo, Calif.

Although the service provider approach allows a single business to set up a host server for allowing itself and its business partners to use third party or customs applications, this approach does not allow the set up and dismantling of complex arrangements between business partners. For instance, a first business may wish to allow a second business to access a first set of services, while the second business may wish to provide a second different set of services to the first business. Additionally, each business may wish to flexibly invite selected users (while denying other users) to access particular services.

In view of the above, there is a need for facilitating the flexible and efficient sharing of services between diverse business entities in a scalable manner. In other words, mechanisms for efficiently and reliably provisioning services between business entities (as well as other entity types) is needed.

SUMMARY OF THE INVENTION

Accordingly, the present invention provides methods and apparatus for effectively provisioning services for access by other entities or services. In general, a service manager is configured to manage the provisioning of services between remote entities within a computer network. In general terms, a remote entity offers a service to another remote entity through the service manager. The service manager facilitates formation of the offer to one or more Invitee(s) specified by the service provider. After an offer is formed, it may then be provided to the specified Invitee(s). After an Invitee receives an offer, the Invitee may accept the offer through the service manager or let the offer expire. The service manager also preferably tracks the status of each offer and whether each specified Invitee has accepted such offer. After an Invitee accepts an offer, the service manager preferably records information sufficient for the Invitee to use the offered service.

In one embodiment, a method for provisioning services within a computer network is provided. An offer pertaining to a service is received. The offer is created by a provider and transmitted from a first device to a second device within the computer network. Identifying information regarding one or more invitees to be invited to access the service of the offer are also received. The one or more invitees are also transmitted from the first device to the second device. In response to receipt of the offer and the identifying information regarding the one or more invitees, an invitation is then provided to each of the one or more invitees to access the service of the offer based on the received identifying information.

In a specific implementation, the invitation is provided in the form of an email. A unique URL address (Uniform Resource Locator) is also provided for each one or more invitees, and the corresponding URL address is provided in the each email to each invitee, wherein the URL address points to one or more web pages which allows the each invitee to register identifying information and accept terms for the offer. In one aspect, the unique URL address is provided to the provider by a provisioning service implemented on the second device, and the provider sends the each email to each of the one or more invitees. In another aspect, the each email is provided by a provisioning service implemented on the second device.

In a further implementation, the offer and its associated one or more invitees are stored. In one aspect, the offer and its associated one or more invitees are only stored when the provider is authorized to create the offer, and the invitation is only provided to the one or more each invitees when the provider is authorized to create the offer. An error message may be sent to the provider when the provider is not authorized to create the offer.

In yet another implementation, a registration input form is presented to a first invitee of the one or more invitees for the offer when the first invitee accesses the invitation. The identifying information received for the first invitee is preferably pre-filled into the presented registration form. In one aspect, the invitation to the each one or more invitees further allows the each one or more invitees to accept the invitation.

In another embodiment, an acceptance link is presented to the first invitee when the invitee submits the registration form with identifying information. In a further aspect, permissions are set up between the first invitee and the service when the first invitee registers and accepts the offer. In one aspect, permissions are not set up when the first invitee is not authorized to accept the offer.

In yet another embodiment, when the first invitee accepts the first offer, an indicator that the first invitee accepted the offer and the date of such acceptance are stored. When the first invitee does not accept the offer, an indicator that the first invitee did not accept the offer is stored. When the first invitee registers, an indicator regarding the registration and the date of such registration are stored. When the first invitee does not register, an indicator that the first invitee did not register is stored. In a further aspect, the indicator regarding the acceptance, the date of acceptance by the first invitee, and the indicator regarding registration are provided to the provider when the provider queries regarding the first invitee or the offer.

In another embodiment, the invention pertains to a computer system operable to provision services within a computer network. The computer system includes one or more processors and one or more memory. At least one of the memory and processors are adapted to provide at least some of the above described method operations. In yet a further embodiment, the invention pertains to a computer program product for provisioning services within a computer network. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 3 is a diagrammatic representation of a plurality of data structures within the repository of FIG. 1 in accordance with one embodiment of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
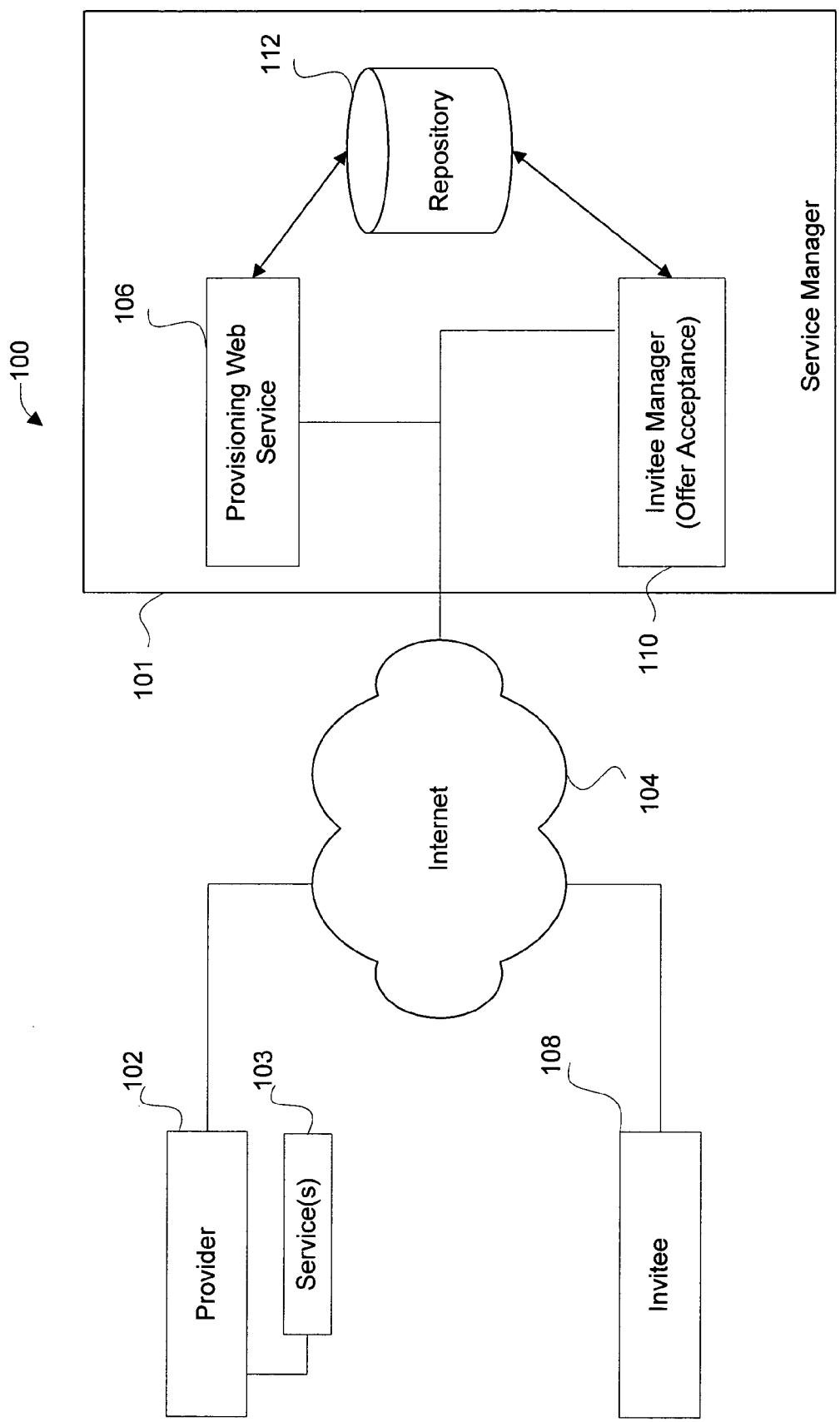
FIG. 1 is a diagrammatic representation of an exemplary network in which techniques of the present invention may be implemented.

FIG. 1 is a diagrammatic representation of an exemplary network in which techniques of the present invention may be implemented. FIG. 1 is used herein as an example for describing techniques of the present invention. As shown, the network 100 includes a Service Manager 101 for facilitating the provisioning of services between a plurality of entities. In a specific example, one or more service(s) 103 are being provisioned by a Provider 102 to an Invitee 108. In this example, Service Manager 101 provides a mechanism for the Provider 103 to offer one or more service(s) to Invitee 108. Although not shown, of course, the Service Manager 101 is configured to provision service between multiple Providers and multiple Invitees.

A service may represent any computer application, entity, or device accessible to other applications, entities, or devices through an interface such as an application programming interface (API), user interface, or Internet web user interface by any of a variety of protocols over a network within an entity or over the public Internet. A service may also be comprised of multiple methods or applications on a single device or distributed across multiple devices.

In the present invention, services may be offered to any number and type of Invitees. The Invitees may represent any suitable entity for provisioning a service thereto. By way of examples, the Invitee is in the form of a user or individual entity from a particular organization or a particular organization entity. The Invitee may also itself be a provider of one or more service(s) to other entities (or to the Provider 102). In one embodiment, the Provider is an organization administrator from a first organization and the Invitee is a user from a second organization, where such organizations may represent distinct business entities, parts of the same business entity, or administrative domains of computer applications. In this example, the Provider and Invitee each represent a person. The Provider and Invitee may each communicate with the computer network 100 via two different remote computer nodes or systems (e.g., personal computer systems or computer work stations). Alternatively, the Provider and Invitee could simply use different user personas on a same computer system. In general, the Provider and Invitees are each defined as a unique entity which are each capable of interacting with one or more services. The Provider and Invitee may also be defined as services.

In one configuration of the present invention, the Service Manager 101 includes any number of mechanisms for facilitating provisioning of services between two or more remote entities (e.g., between a Provider and an Invitee). In the illustrated embodiment, the Service Manager includes a Provisioning Web Service 106 for provisioning the services of Providers to Invitees and an Invitee Manager 110 for handling offer acceptance with respect to Invitees. The Service Manager 101 also preferably includes a repository 112 for storing various information regarding the services and entities which provision and/or use such services.

The Service Manager preferably also includes mechanisms for creating services, registering users and their identifying information, and handling messages routed between services and/or users. Several embodiments for performing these additional tasks are described in the above referenced Lev Brouk et al. U.S. patent application. The techniques of the present invention may easily be incorporated with the additional tasks described in this Lev Brouk et al. application.

Figure 2:
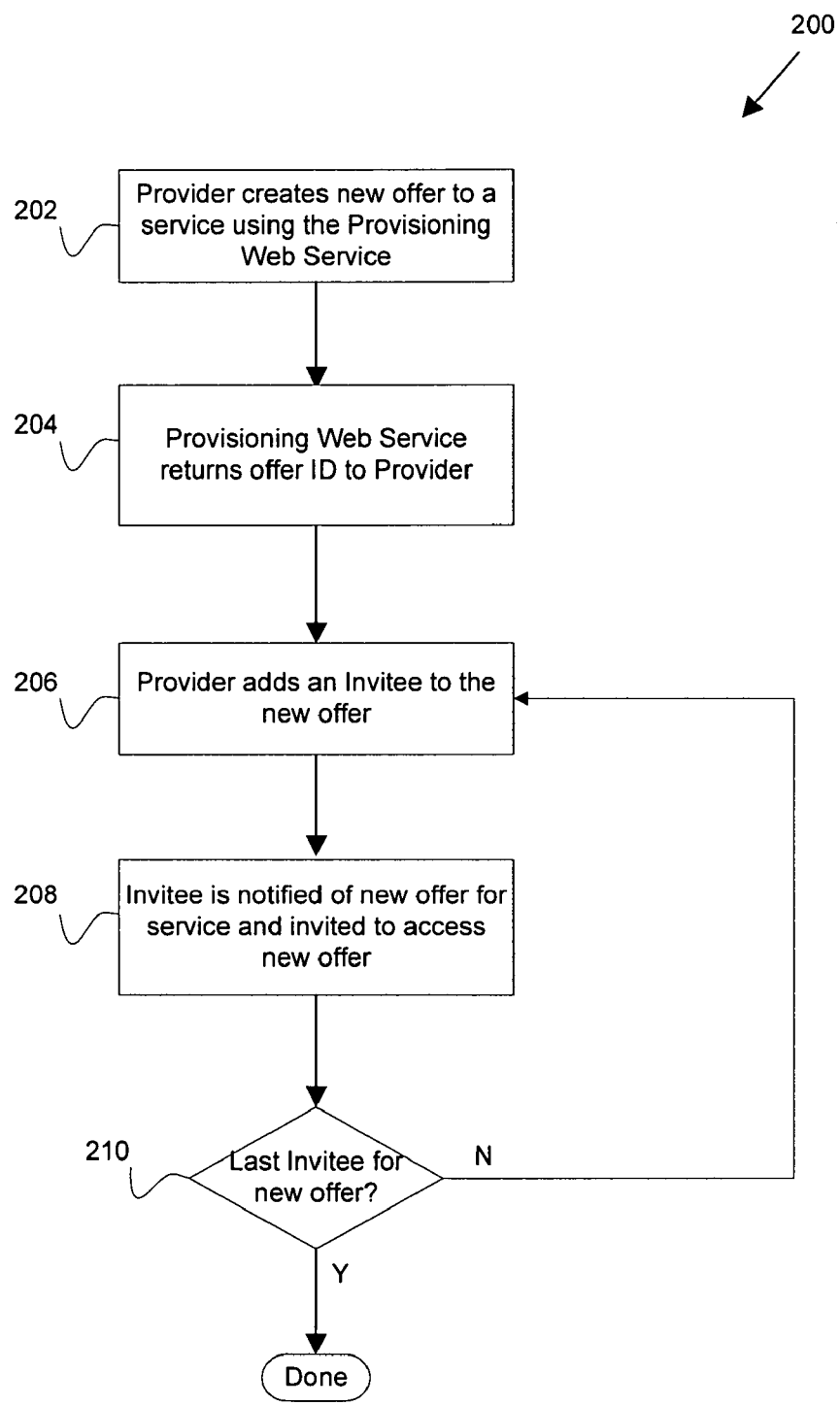
FIG. 2 is a flowchart illustrating a procedure for creating an offer of a service to one or more Invitees in accordance with one embodiment of the present invention.

FIG. 2 is a flowchart illustrating a procedure 200 for creating an offer of a service to one or more Invitees in accordance with one embodiment of the present invention. FIG. 2 represents an example flow for offer creation, and permutations (e.g., error handling and database management) on this basic flow are further described below. As shown in FIG. 2, a Provider initially creates a new offer to a service using the Provisioning Web Service in operation 202. In general, an offer is created when a Provider provides information regarding the offer to the Provisioning Web Service 106. Offer creation is described further below.

The service referred to in the offer may, in fact, include a set of services or method objects which are configured to work together as a single entity. More typically, the service refers to a single service or method object.

In the illustrated embodiment, the Provisioning Web Service 106 then returns an offer identifier (ID) to the provider in operation 204. The Provider can then use this offer ID to add an Invitee to the new offer in operation 206. The Invitee is then notified of the new offer for the service and invited to access the new service in operation 208. As described further below, the Invitee may be notified by the Provider or by the Provisioning Web Service 106 in any suitable manner, such as via an email. The notification preferably allows the Invitee to provide identifying information (referred herein as "Registration") and accept the offer. After the new Invitee is notified, it may then be determined whether this is the last Invitee for the new offer in operation 210. If this is not the last Invitee, other Invitees may then be added for the new offer and notified of such new offer in operations 206 through 208. When the Provider does not wish to add any more Invitees for the new offer, the procedure 200 ends.

In an alternative embodiment, information regarding all of the Invitees may be collected prior to notifying all of the Invitees of the offer. Preferably, the Provisioning Web Service 106 is configured to allow a Provider to add new Invitees to a new offer during multiple communication sessions. For instance, a first set of Invitees may be added to a new offer during a first session with the Provisioning Web Service 106 and a second set of Invitees added later to the new offer during a second session with the Provisioning Web Service 106.

FIG. 3 is a diagrammatic representation of a plurality of data structures within repository 112 of FIG. 1 in accordance with one embodiment of the present invention. The repository may be formed from one or more databases located in one or more memory devices on one or more computer systems, and the data structures may be formatted in any suitable format for storing and correlating information regarding service provisioning. These data structures will be described in conjunction with the following techniques of the present invention.

As shown, the repository 112 includes an offer data structure 302 for encapsulating information regarding each offer, a service data structure 304 for holding information regarding various services which may be provisioned to one or more entities, an Invitee data structure 306 for encapsulating information regarding each Invitee, an organization data structure 310 for holding information regarding organizations which utilize services, a user data structure 312 for holding information regarding individual users or groups of users which utilize services, and a permissions data structure 308 for relating permissions set up between services, organizations, and users. In the illustrated embodiment, an Invitee becomes a user after it registers its identifying information in response to a service offer and accepts such offer. These data structures will be described further below.

Figure 4A:
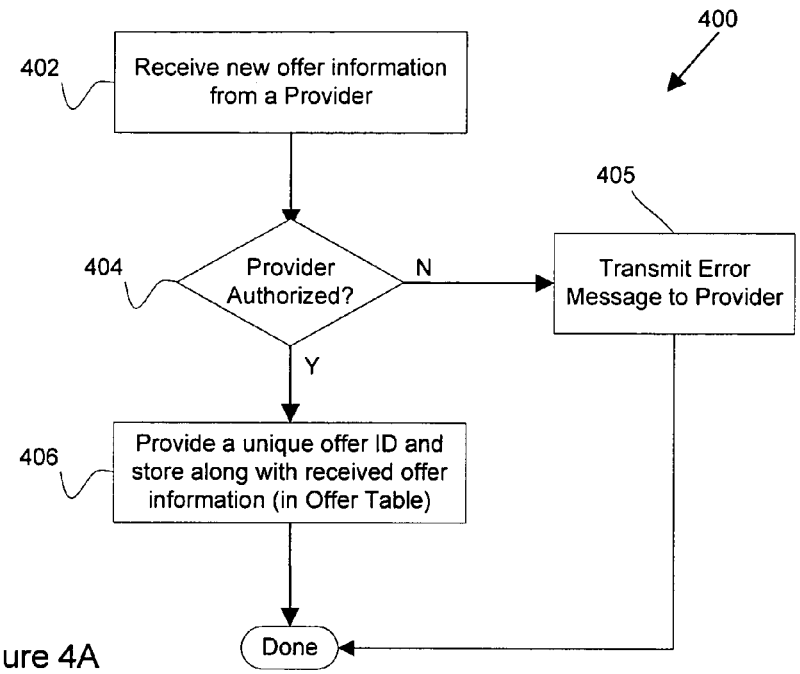
FIG. 4A is a flowchart illustrating a procedure for handling new offers received by a Provisioning Web Service in accordance with one embodiment of the present invention.

The Provisioning Web Service 106 operates to retain information regarding a new offer for later use by a Provider when adding an Invitee to an offer or by the Invitee Manager 110 for handling offer acceptance, as well as any other procedures carried out with respect to an offer. FIG. 4A is a flowchart illustrating a procedure 400 for handling new offers received by the Provisioning Web Service in accordance with one embodiment of the present invention. Initially, new offer information is received from a provider in operation 402. It is then determined whether the provider is authorized to create the new offer in operation 404. If the provider is authorized, a unique offer ID is provided and stored along with the new offer information (e.g., in offer table 302) in operation 406. If the provider is not authorized, an error message may then be transmitted to the provider in operation 405. The procedure then ends. In a less preferred embodiment, authorization determination is skipped.

As illustrated in FIG. 3, the offer table 302 includes offer information for each offer (e.g., received from a Provider or provided by the Provisioning Web Service 106). The offer information 302 for each offer generally includes a unique offer ID and a unique identifier for the service being offered. The offer ID is provided by the Provisioning Web Service 106 to uniquely identify each new offer received into the Provisioning Web Service 106 and may be returned to the Provider for use in adding Invitees to the corresponding offer. The unique service identifier can also reference service information 304 for the offered service.

The offer information 302 also preferably includes a unique organization ID for identifying the organization providing the service, an offer description, an expiration date for the offer, and an expiration selection field to specify whether the Provider has provided an expiration date. The organization ID may be used to determine whether the Provider is authorized to create the new offer to a particular service. In one implementation, only organizations which own the offered service may offer such service. Additionally, authorization may include identification of the Provider. That is, the Provider may have to provide a user ID and/or password to create an offer. It may then be determined whether the particular user is authorized to create the offer. In one example, only organization administrators may create a new offer.

The offer description is optionally provided by the Provider and may be automatically included in the invitation to the Invitee. However, the Provider may opt to manually include an offer description when sending an invitation to an Invitee. In one implementation, the Provider may describe the offer in the body of an email sent to the Invitee, where the body of the email also includes a URL link to the invitation or alternatively the offer description may be automatically presented after the Invitee selects the URL link.

The expiration date for each offer may also be optional and may have any suitable format for specifying an expiration date or time. In the illustrated embodiment, the Provider may specify an expiration day, month, and year. When an expiration date is not specified by the Provider, the expiration selection field may be set to FALSE; otherwise, it is set to TRUE. This expiration selection field may be used to determine whether to automatically set a default expiration date (e.g., 60 days) for an offer. For instance, a default expiration date may be set when the expiration selection field is set to FALSE. Otherwise, the Provider's expiration date is used.

Figure 4B:
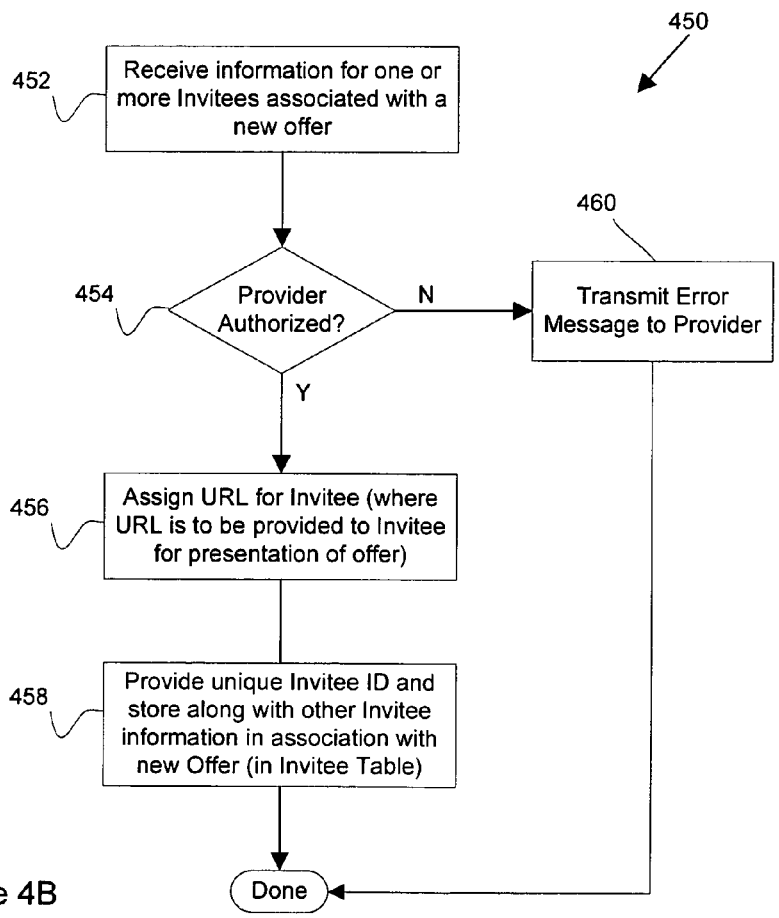
FIG. 4B is a flowchart illustrating a procedure for handling the receipt of information regarding one or more Invitees at a Provisioning Web Service in accordance with one embodiment of the present invention.

Preferably, the Provisioning Web Service 106 also operates to retain information regarding each Invitee for later use during offer acceptance by an Invitee, as well as any procedures carried out with respect to an Invitee and corresponding offer. FIG. 4B is a flowchart illustrating a procedure 450 for handling the receipt of information regarding one or more Invitees at the Provisioning Web Service in accordance with one embodiment of the present invention. Initially, information for one or more Invitees is received when the Provider adds an Invitee to an offer in operation 452. It may then be determined whether the provider is authorized in operation 454, e.g., as described above for authorization of the offer.

If the provider is authorized, a URL (Uniform Resource Locator) is then assigned for each Invitee in operation 456. The URL for each Invitee generally provides a mechanism for presenting a new offer to each Invitee. Although the present invention is described in terms of presenting an invitation in the form of a URL, of course, any other suitable interface to the Service Manager 101 may be utilized, such as an API, for presenting an invitation to an Invitee. A unique Invitee ID is then provided and stored along with the Invitee information in association with the new offer in operation 458. For example, the Invitee information is stored within Invitee table 306. If the Provider is not authorized, an error message may be transmitted to the Provider in operation 460 and the offer information is preferably not stored.

As illustrated in FIG. 3, the Invitee table 306 includes Invitee information for each Invitee (e.g., received from a Provider or provided by the Provisioning Web Service 106). The Invitee information 306 for each Invitee generally includes a unique Invitee ID, a corresponding offer ID, Invitee Identify Information, an Accept field for indicating whether the Invitee has accepted the corresponding offer, an Accept date, and a Register field indicating whether the Invitee has registered identifying information with the Invitee Manager 110.

As shown, the Invitee table 306 includes information for Invitees 1 through 4. Invitees 1 and 2 have been offered Offers A, while Invitee 3 has been offered Offer B and Invitee 4 has been offered Offer C. In general, each service may be offered to multiple Invitees and each Invitee may be offered multiple services. The Invitee table 306 also shows that Invitees 1 and 4 have registered their identifying information, while Invitees 2 and 3 have not. This table 306 also shows that Invitees 1, 3, and 4 have accepted their corresponding offers A, B and C (and the acceptance dates), while Invitee 2 has not accepted offer A.

The Invitee Identifying Information for each Invitee may include any relevant information about the Invitee. Preferably, this information includes the Invitee's email address which may be later used to verify the Invitee during acceptance of an offer and registration of the Invitee. By way of examples, this information may also include any combination of the following for the Invitee: address, name, surname, title, phone number, phone extension, fax number, and organization name or ID.

After an Invitee receives an invitation or offer to access a service, the Invitee may then register identifying information regarding itself and/or accept the offer through the Invitee Manager 110. To accomplish this, the Invitee may be presented an interface for providing registration information and for accepting offer terms in any suitable order. The Invitee's authority to accept such offer may also be verified during any point in the invitation handling process. The Invitee may also let the offer expire. These tasks for handling an invitation/offer may be accomplished in any suitable manner.

Figure 5:
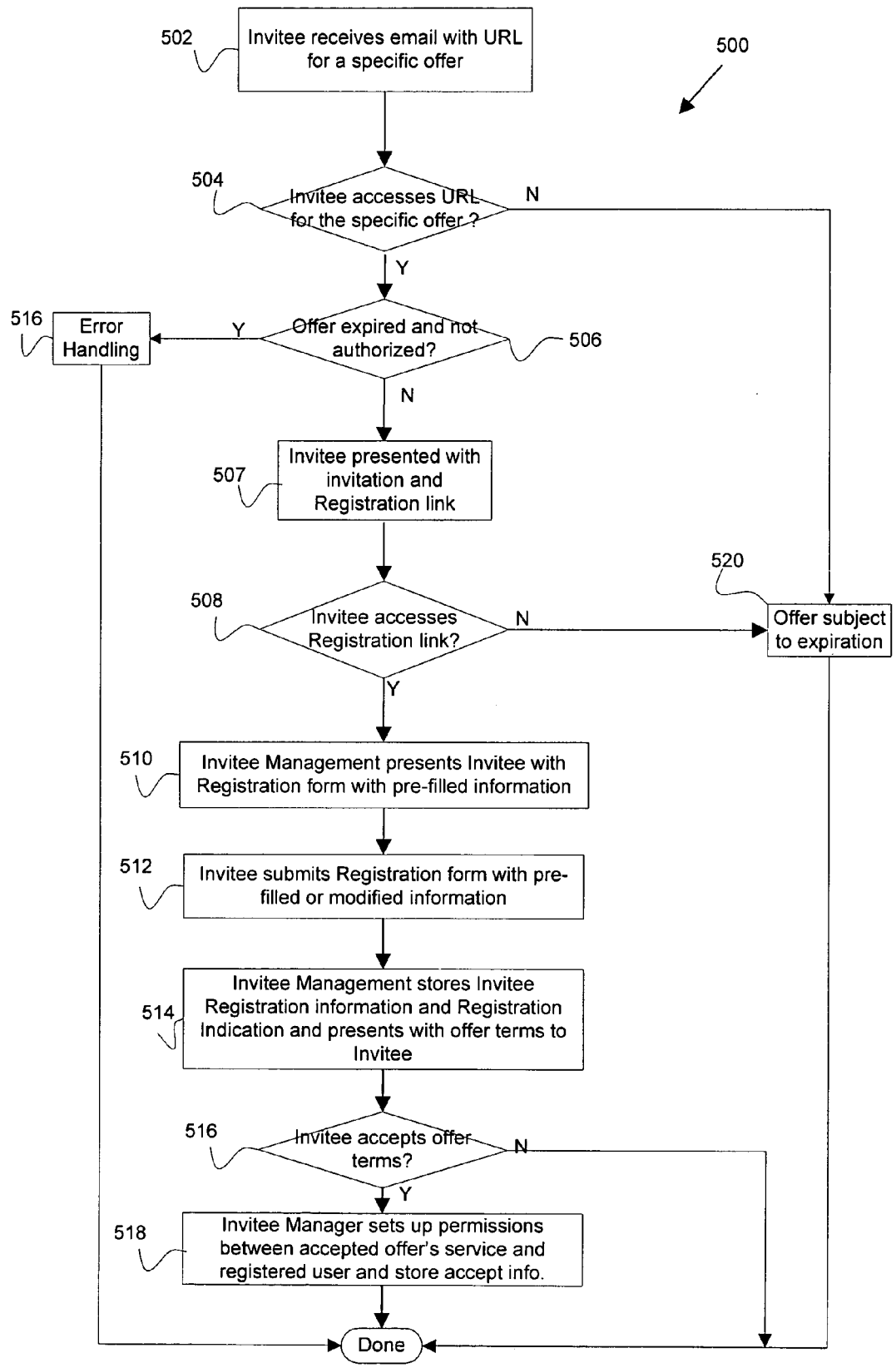
FIG. 5 is a flowchart illustrating a procedure for handling an offer in accordance with a specific implementation of the present invention.

FIG. 5 is a flowchart illustrating a procedure 500 for handling an offer in accordance with a specific implementation of the present invention. Initially, an Invitee receives an email with a URL for a specific offer in operation 502. In this embodiment, the URL corresponds to the specific offer and a specific Invitee. When the Invitee accesses the URL, the unique Invitee ID and Offer ID (provided by the Provisioning Web Service 106 when the Invitee was added to the specific offer by the Provider) are incorporated into the resulting request sent to the Invitee Manager 110. Thus, the Invitee Manager 110 obtains information regarding when an Invitation is accessed for a particular offer by a particular Invitee.

After an Invitee accesses the URL in operation 504, it may then be determined whether the offer has expired and the Invitee is not authorized in operation 506. In the illustrated embodiment, if the offer has not expired and the Invitee is authorized, the Invitee is presented with an Invitation page having a registration link in operation 507. Authorization of the Invitee may be determined in any suitable manner. In one implementation, when the Invitee access the invitation (e.g., through the URL), the Invitee's email address may be verified against the email address which was stored for the Invitee during the offer creation process.

When the Invitee accesses the registration link in operation 508, the Invitee Manager then presents the Invitee with a registration form which may contain pre-filled information in operation 510. This pre-filled information may include Invitee Identifying Information as provided by the Provider. The Invitee may then submit the registration form with pre-filled or modified information in operation 512. After submission of the registration form, it may optionally be determined again whether the offer has expired (not shown) prior to proceeding.

After the Invitee submits the registration form (and the offer has not expired), the Invitee Manager stores the Invitee's registration or identifying information, and a registration indication and/or date and presents the Invitee with offer terms in operation 514. For example, a TRUE is stored in the Register field of the Invitee in the Invitee table 306 to indicate registration of the specific Invitee and the Invitee's identifying information is stored in the User Table 312. As shown in FIG. 3, the User Table 312 generally includes a unique User ID and user identifying information. The unique User ID for a new registered Invitee may be identical to the unique Invitee ID provided by the Provisioning Web Service 106. Identifying information regarding the registered Invitee's organization is also preferably stored in the Organization Table 310. The Invitee Manager may also store service information representing the Invitee in the Service Table 304.

A registration completion date may also be stored in the Invitee table (not shown). Registration completion may also be inferred by addition of the Invitee and their corresponding identifying information into the User Table 312.

The offer terms may include any suitable terms as worked out with the Provider or as preconfigured within the Service Manager 101. When the Invitee accepts the offer terms in operation 516, the Invitee Manager 110 then sets up permission between the Invitee and the accepted service and information regarding the offer acceptance is stored in operation 518. The procedure 500 then ends.

In the illustrated embodiment, an entry is added to the Permission Table 308 indicating that the accepted service is associated with a Grantor ID (e.g., from the Provider) who has provisioned the service and a Grantee ID (e.g., from the registered Invitee/User) who has accepted the service. Additionally, the Accept field for the particular Invitee in the Invitee table 306 is set to TRUE, when an accept occurs. Otherwise, this field defaults to FALSE. An Accept Date may also be specified in the Invitee Table.

If the Invitee fails to access the URL, register, or accept the offer terms, the offer is subject to expiration in operation 520. The Invitee can, however, access the URL, register, and accept the offer at a later time prior to the offer expiring. If the offer expires, the offer and Invitee information is still preferably retained for later access by the Provider. Alternatively, the offer may not have an expiration date. If the offer has expired and the Invitee is still attempting to access the invitation or the Invitee is not authorized, error handling may then be performed in operation 516. When the Invitee also attempts to access the Registration link at operation 508, it may also be determined whether the offer has expired. If the offer has expired, error handling may then be performed. Error handling may include sending an error message indicating "offer has expired" or "access denied" to the Invitee.

In the above described invitation handling procedure 500, the operations for registering the Invitee may be skipped if the Invitee is already registered. In this case, an option may be presented in the invitation page for registered users. When the Invitee selects this option, the offer terms are immediately presented to the registered Invitee/User for acceptance by same.

The repository 112 may also include a directory of services and an indication as to whether particular users can view a service. In some cases, a user may be allowed to view a service, but not permitted to use such service. In other cases, a user may be allowed to both view and use a service. In this application, after an Invitee is registered and accepts an offered service, this service directory is also updated to indicate that the Invitee can view the service, in addition to setting up access permissions (e.g., in the Permission table 308).

At any point after sending an invitation to an Invitee, the Provider may check the status of an offer or a specific invitation. In one embodiment, the Provider queries the Service Manager 101 (e.g., via the Provisioning Web Service 106 or the Invitee Manager 110) regarding a specific offer or Invitee. The Service Manager then compiles information regarding the specified offer or Invitee and sends a status update back to the Provider. For instance, the status update for a particular Invitee to a particular offer may include an indication as to whether the Invitee has registered, date of registration, whether the Invitee has accepted the offer, date of acceptance, and whether the offer has expired. This status information may be gleaned from the tables of FIG. 3. The status update of a particular offer may include a list of Invitees and their corresponding status.

The above described embodiments for provisioning services advantageously provide an efficient mechanism for providing access to services to various entities. The provisioning mechanisms allow diverse services to be provisioned among a diverse set of entities. The service access arrangements can be any suitable complexity and merely depend on the size of the memory for holding information regarding such services and their provisioning. Accordingly, the provisioning services of the present invention are easily scalable.

In a particular application of the provisioning embodiments of the present invention, a first business entity may provision a service to a second business entity who may or may not be registered with the Service Manager. The second business entity may also provision its own services back to the first business entity, to a third business entity, or any suitable number and type of other business entities. In sum, each entity (e.g., business invitee, user or organization) may provision any number of its services to any number and type of entities. Said in another way, each service may be provisioned to any number and type of entities or entity objects (e.g., user or organization services). The provisioning techniques of the present invention may also allow a user who has successfully been provisioned a service to then provision that service to another invitee, user or organization. That is, a user of a service may be given authorization (e.g., by the original provider) to provision such service, as well as the original provider being authorized.

Generally, the techniques for securely handling service provisioning of the present invention may be implemented on software and/or hardware. For example, it can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. In one embodiment, portions of the service provisioning system (e.g., Provider 102, Invitee 108, Provisioning Web Service 106, Invitee Manager 110, or Service Manager 101) may be implemented on a general-purpose network host machine such as a personal computer or workstation.

Figure 6:
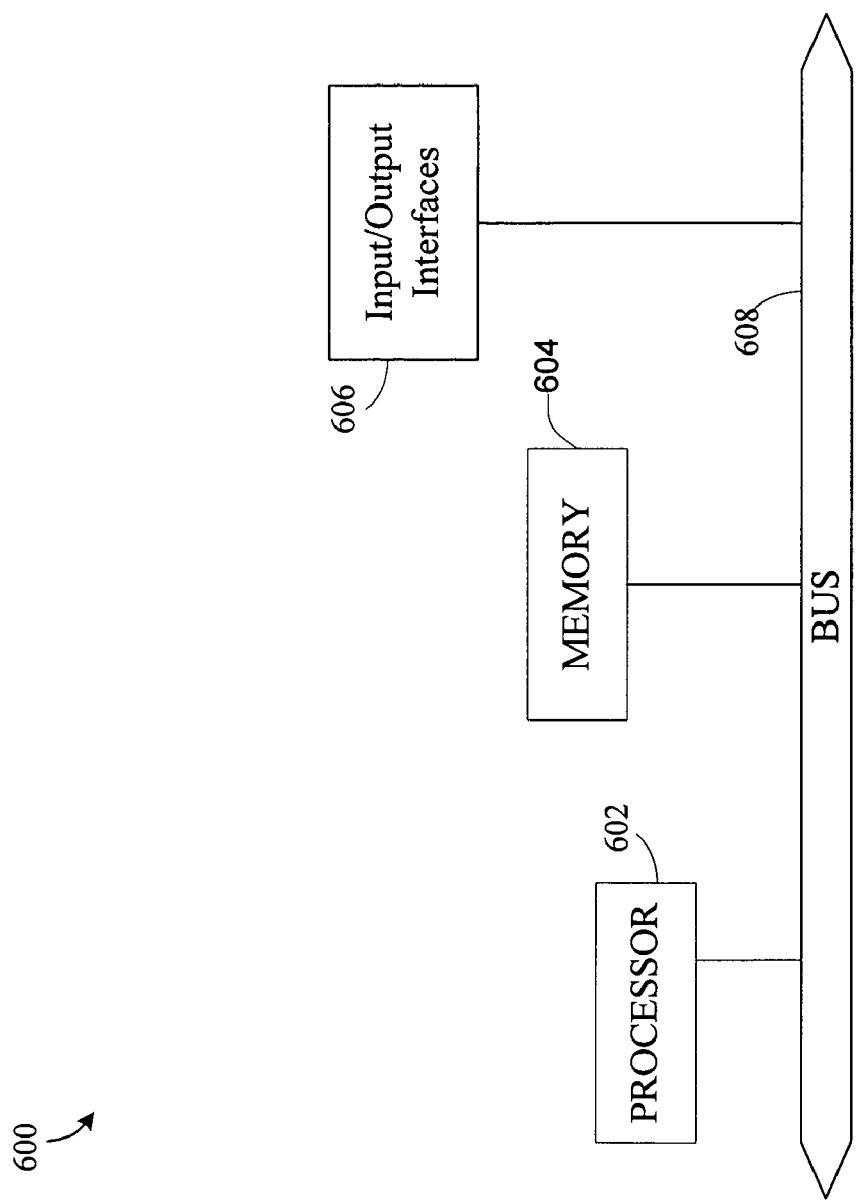
FIG. 6 is a diagrammatic representation of an example computer system in which embodiments of the present invention may be implemented.

Referring now to FIG. 6, a computer system 600 suitable for implementing the present invention includes a master central processing unit (CPU) 602, one or more memory 604, input and output interfaces 606, and a bus 608 (e.g., a PCI bus). When acting under the control of appropriate software or firmware, the CPU 602 is responsible for implementing various portions of the techniques of the present invention. It preferably accomplishes all these functions under the control of software including an operating system and any appropriate applications software. CPU 602 may include one or more processors such as a processor from the Motorola family of microprocessors or the MIPS family of microprocessors. In a specific embodiment, a memory 604 (such as non-volatile RAM and/or ROM) also forms part of CPU 602. However, there are many different ways in which memory could be coupled to the system. Memory block 604 may be used for a variety of purposes such as, for example, caching and/or storing data, programming instructions, etc.

The input and output interfaces 606 typically provide an interface to various I/O devices, such as mouse, keyboard, display, as well as providing an communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

Although the system shown in FIG. 6 is one specific computer system of the present invention, it is by no means the only system architecture on which the present invention can be implemented.

Regardless of system's configuration, it may employ one or more memories or memory modules (such as, for example, memory block 604) configured to store data, program instructions for the general-purpose network operations and/or the inventive techniques described herein. The program instructions may control the operation of an operating system and/or one or more applications, for example. The memory or memories may also be configured to store information in repository 112, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for provisioning services, the method comprising:

providing a service manager system operable to mediate messages sent with respect to a plurality of services of a plurality of different providers, wherein the services include different sets of one or more computer applications;

receiving a first offer pertaining to a first service and a second offer pertaining to a second service that includes one or more computer applications that differ from the one or more computer applications of the first service, the first offer being provided by a first provider of the first service to which the first offer pertains and being transmitted from a first device to the service manager system, the second offer being provided by a second provider of the second service to which the second offer pertain and being transmitted from a second device to the service manager system;

receiving identifying information regarding one or more first invitees to be invited to access the first service of the first offer, the identifying information regarding the one or more first invitees being transmitted from the first device to the service manager system, and receiving identifying information regarding one or more second invitees to be invited to access the second service of the second offer, the identifying information regarding the one or more second invitees being transmitted from the second device to the serve manager system;

in response to receipt of the first offer and the identifying information regarding the one or more first invitees, providing by the service manager system an invitation to each of the one or more first invitees to access the first service of the first offer through the service manager system and based on the received identifying information regarding the one or more first invitees; and in response to receipt of the second offer and the identifying information regarding the one or more second invitees, providing by the service manager system an invitation to each of the one or more second invitees to access the second service of the second offer through the service manager system and based on the received identifying information regarding the one or more second invitees.

2. A method as recited in claim 1, wherein the invitation is provided in the form of an email.

3. A method as recited in claim 1, wherein the invitation is provided in the form of a message or an FTP (file transfer protocol) drop.

4. A method as recited in claim 1, further comprising:

providing a unique URL address (Uniform Resource Locator) for each one or more invitees; and providing the corresponding URL address in the each invitation to each invitee, wherein the URL address points to one or more web pages which allows the each invitee to register identifying information and accept terms for the offer.

5. A method as recited in claim 4, wherein the unique URL address is provided to the provider by a provisioning service implemented on the service manager system, and wherein the provider sends the each invitation to each of the one or more invitees.

6. A method as recited in claim 4, wherein the each invitation is provided by a provisioning service implemented on the service manager system.

7. A method as recited in claim 1, further comprising storing the offer and its associated one or more invitees.

8. A method as recited in claim 7, wherein the offer and its associated one or more invitees are only stored when the provider is authorized to create the offer, and
wherein the invitation is only provided to the one or more each invitees when the provider is authorized to create the offer.

9. A method as recited in claim 8, further comprising sending an error message to the provider when the provider is not authorized to create the offer.

10. A method as recited in claim 1, further comprising presenting a registration input form to a first invitee of the one or more invitees for the offer when the first invitee accesses the invitation.

11. A method as recited in claim 10, wherein the identifying information received for the first invitee is pre-filled into the presented registration form.

12. A method as recited in claim 10, wherein the invitation to the each one or more invitees further allows the each one or more invitees to accept the invitation.

13. A method as recited in claim 12, further comprising presenting an acceptance link to the first invitee when the invitee submits the registration form with identifying information.

14. A method as recited in claim 12, further comprising:
setting up permissions between the first invitee and the service when the first invitee registers and accepts the offer.

15. A method as recited in claim 14, wherein permissions are not set up when the first invitee is not authorized to accept the offer.

16. A method as recited in claim 12, further comprising:
when the first invitee accepts the first offer, storing an indicator that the first invitee accepted the offer and the date of such acceptance;
when the first invitee does not accept the offer, storing an indicator that the first invitee did not accept the offer;
when the first invitee registers, storing an indicator regarding the registration and the date of such registration; and
when the first invitee does not register, storing an indicator that the first invitee did not register.

17. A method as recited in claim 16, further comprising providing the indicator regarding the acceptance, the date of acceptance by the first invitee, and the indicator regarding registration to the provider when the provider queries regarding the first invitee or the offer.

18. A method as recited in claim 9, wherein the registration form is presented to the first invitee by presenting an invitation page having a registration link, the method further comprising:
presenting an option link in the invitation page, wherein the option can be accessed by invitees which have already registered;
presenting an acceptance link to the first invitee when the invitee submits the registration form with identifying information; and
presenting the acceptance link to the first invitee when the invitee selects the option link and the first invitee is already registered.

19. A computer system operable to provisioning services within a message interchange network, the computer system comprising:
a service manager system operable to mediate messages sent with respect to a plurality of services of a plurality of different providers, wherein the services include different sets of one or more computer applications;
one or more processors associated with the service manager system;
one or more memory associated with the service manager system receiving a first offer pertaining to a first service and a second offer pertaining to a second service includes one or more computer applications that differ from the one or more computer applications of the first service, the first offer being provided by a first provider of the first service to which the first offer pertains and being transmitted from a first device to the service manager system, the second offer being provided by a second provider of the second service to which the second offer pertain and being transmitted from a second device to the service manager system;
receiving identifying information regarding one or more first invitees to be invited to access the first service of the first offer, the identifying information regarding the one or more first invitees being transmitted from the first device to the service manager system, and receiving identifying information regarding one or more second invitees to be invited to access the second service of the second offer, the identifying information regarding the one or more second invitees being transmitted from the second device to the serve manager system;
in response to receipt of the first offer and the identifying information regarding the one or more first invitees, providing by the service manager system an invitation to each of the one or more first invitees to access the first service of the first offer through the service manager system and based on the received identifying information regarding the one or more first invitees; and
in response to receipt of the second offer and the identifying information regarding the one or more second invitees, providing by the service manager system an invitation to each of the one or more second invitees to access the second service of the second offer through the service manager system and based on the received identifying information regarding the one or more second invitees.

20. A computer system as recited in claim 19, wherein the invitation is provided in the form of an email.

21. A computer system as recited in claim 19, wherein the invitation is provided in the form of a message or an FTP (file transfer protocol) drop.

22. A computer system as recited in claim 20, wherein the at least one of the processors and memory are further adapted for:
providing a unique URL address (Uniform Resource Locator) for each one or more invitees; and
providing the corresponding URL address in the each email to each invitee, wherein the URL address points to one or more web pages which allows the each invitee to register identifying information and accept terms for the offer.

23. A computer system as recited in claim 22, wherein the unique URL address is provided to the provider by a provisioning service implemented on the service manager system, and
wherein the provider sends the each email to each of the one or more invitees.

24. A computer system as recited in claim 19, wherein the at least one of the processors and memory are further adapted for storing the offer and its associated one or more invitees.

25. A computer system as recited in claim 19, wherein the at least one of the processors and memory are further adapted for presenting a registration input form to a first invitee of the one or more invitees for the offer when the first invitee accesses the invitation.

26. A computer system as recited in claim 25, wherein the identifying information received for the first invitee is pre-filled into the presented registration form.

27. A computer system as recited in claim 25, wherein the invitation to the each one or more invitees further allows the each one or more invitees to accept the invitation.

28. A computer system as recited in claim 27, wherein the at least one of the processors and memory are further adapted for presenting an acceptance link to the first invitee when the invitee submits the registration form with identifying information.

29. A computer system as recited in claim 27, wherein the at least one of the processors and memory are further adapted for:
setting up permissions between the first invitee and the service when the first invitee registers and accepts the offer.

30. A computer system as recited in claim 29, wherein permissions are not set up when the first invitee is not authorized to accept the offer.

31. A computer system as recited in claim 28, wherein the at least one of the processors and memory are further adapted for:
when the first invitee accepts the first offer, storing an indicator that the first invitee accepted the offer and the date of such acceptance;
when the first invitee does not accept the offer, storing an indicator that the first invitee did not accept the offer;
when the first invitee registers, storing an indicator regarding the registration and the date of such registration; and
when the first invitee does not register, storing an indicator that the first invitee did not register.

32. A computer system as recited in claim 31, wherein the at least one of the processors and memory are further adapted for providing the indicator regarding the acceptance, the date of acceptance by the first invitee, and the indicator regarding registration to the provider when the provider queries regarding the first invitee or the offer.

33. A computer system as recited in claim 25, wherein the registration form is presented to the first invitee by presenting an invitation page having a registration link, wherein the at least one of the processors and memory are further adapted for:
presenting an option link in the invitation page, wherein the option can be accessed by invitees which have already registered;
presenting an acceptance link to the first invitee when the invitee submits the registration form with identifying information; and
presenting the acceptance link to the first invitee when the invitee selects the option link and the first invitee is already registered.

34. A computer program product, stored on a machine-readable medium, for provisioning services within a message interchange network, the computer program product comprising instructions operable to cause a computer to:

in a service manager system operable to mediate messages sent with respect to a plurality of services of a plurality of different providers, wherein the services include different sets of one or more computer applications, receive a first offer pertaining to a first service and a second offer pertaining to a second service that includes one or more computer applications that differ from the one or more computer applications of the first service, the first offer being provided by a first provider of the first service to which the first offer pertains and being transmitted from a first device to the service manager system, the second offer being provided by a second provider of the second service to which the second offer pertain and being transmitted from a second device to the service manager system;

receive identifying information regarding one or more first invitees to be invited to access the first service of the first offer, the identifying information regarding the one or more first invitees being transmitted from the first device to the service manager system, and receive identifying information regarding one or more second invitees to be invited to access the second service of the second offer, the identifying information regarding the one or more second invitees being transmitted from the second device to the serve manager system;

in response to receipt of the first offer and the identifying information regarding the one or more first invitees, provide by the service manager system an invitation to each of the one or more first invitees to access the first service of the first offer through the service manager system and based on the received identifying information regarding the one or more first invitees; and in response to receipt of the second offer and the identifying information regarding the one or more second invitees, provide by the service manager system an invitation to each of the one or more second invitees to access the second service of the second offer through the service manager system and based on the received identifying information regarding the one or more second invitees.

35. A computer program product as recited in claim 34, wherein the invitation is provided in the form of an email.

36. A method as recited in claim 34, wherein the invitation is provided in the form of a message or an FTP (file transfer protocol) drop.

37. A computer program product as recited in claim 35, the computer program product further comprising instructions to:
provide a unique URL address (Uniform Resource Locator) for each one or more invitees; and
provide the corresponding URL address in the each email to each invitee, wherein the URL address points to one or more web pages which allows the each invitee to register identifying information and accept terms for the offer.

38. A computer program product as recited in claim 37, wherein the unique URL address is provided to the provider by a provisioning service implemented on the service manager system, and
wherein the provider sends the each email to each of the one or more invitees.

39. A computer program product as recited in claim 37, wherein the each email is provided by a provisioning service implemented on the service manager system.

40. A computer program product as recited in claim 34, the computer program product further comprising instructions to:
store the offer and its associated one or more invitees.

41. A computer program product as recited in claim 40, wherein the offer and its associated one or more invitees are only stored when the provider is authorized to create the offer, and
wherein the invitation is only provided to the one or more each invitees when the provider is authorized to create the offer.

42. A computer program product as recited in claim 41, the computer program product further comprising instructions to:
send an error message to the provider when the provider is not authorized to create the offer.

43. A computer program product as recited in claim 34, the computer program product further comprising instructions to:
present a registration input form to a first invitee of the one or more invitees for the offer when the first invitee accesses the invitation.

44. A computer program product as recited in claim 43, wherein the identifying information received for the first invitee is pre-filled into the presented registration form.

45. A computer program product as recited in claim 43, wherein the invitation to the each one or more invitees further allows the each one or more invitees to accept the invitation.

46. A computer program product as recited in claim 34, the computer program product further comprising instructions to:
present an acceptance link to the first invitee when the invitee submits the registration form with identifying information.

47. A computer program product as recited in claim 34, the computer program product further comprising instructions to:
set up permissions between the first invitee and the service when the first invitee registers and accepts the offer.

48. A computer program product as recited in claim 47, wherein permissions are not set up when the first invitee is not authorized to accept the offer.

49. A computer program product as recited in claim 46, the computer program product further comprising instructions to:
when the first invitee accepts the first offer, store an indicator that the first invitee accepted the offer and the date of such acceptance;
when the first invitee does not accept the offer, store an indicator that the first invitee did not accept the offer;
when the first invitee registers, store an indicator regarding the registration and the date of such registration; and
when the first invitee does not register, store an indicator that the first invitee did not register.

50. A computer program product as recited in claim 49, the computer program product further comprising instructions to:
provide the indicator regarding the acceptance, the date of acceptance by the first invitee, and the indicator regarding registration to the provider when the provider queries regarding the first invitee or the offer.

51. A computer program product as recited in claim 43, wherein the registration form is presented to the first invitee by presenting an invitation page having a registration link, the computer program product further comprising instructions to:
present an option link in the invitation page, wherein the option can be accessed by invitees which have already registered;
present an acceptance link to the first invitee when the invitee submits the registration form with identifying information; and
present the acceptance link to the first invitee when the invitee selects the option link and the first invitee is already registered.

* * * * *

UNITED STATES PATENT AND TRADEMARK OFFICE
CERTIFICATE OF CORRECTION

PATENT NO. : 7,305,454 B2  Page 1 of 1
APPLICATION NO. : 10/727089
DATED : December 4, 2007
INVENTOR(S) : Watson et al.

It is certified that error appears in the above-identified patent and that said Letters Patent is hereby corrected as shown below:

In the Title Page:

(73) Assignee, change "Minor Ventures, LLC., San Francisco, CA (US)" to

--Salesforce.com, Inc., San Francisco, CA (US)--.

Signed and Sealed this

Twenty-eighth Day of July, 2009

JOHN DOLL
*Acting Director of the United States Patent and Trademark Office*